S. J. STRID.
UNCOUPLING DEVICE FOR RAILWAY CARS.
APPLICATION FILED FEB. 19, 1917.

1,247,172.  Patented Nov. 20, 1917.

Inventor:
Sven J. Strid
By Gleeson & Gleeson
Attys ated loop, and a U-shaped clevis 105
UNITED STATES PATENT OFFICE.

SVEN J. STRID, OF CHICAGO HEIGHTS, ILLINOIS.

UNCOUPLING DEVICE FOR RAILWAY-CARS.

1,247,172.   Specification of Letters Patent.   Patented Nov. 20, 1917.

Application filed February 19, 1917. Serial No. 149,622.

*To all whom it may concern:*

Be it known that I, SVEN J. STRID, a citizen of the United States, and resident of Chicago Heights, county of Cook, and State of Illinois, have invented certain new and useful Improvements in Uncoupling Devices for Railway-Cars, of which the following is a specification, and which are illustrated in the accompanying drawings, forming a part thereof.

The invention relates to devices especially applicable to freight cars for lifting the coupling or locking pin; its objects being to provide a simple and strong connection between the crank shaft and the coupling pin, and which may be made without resorting to welded joints and which will be free in its action.

The invention consists in a device such as is hereinafter described, and as illustrated in the accompanying drawings, in which—

Figure 1:
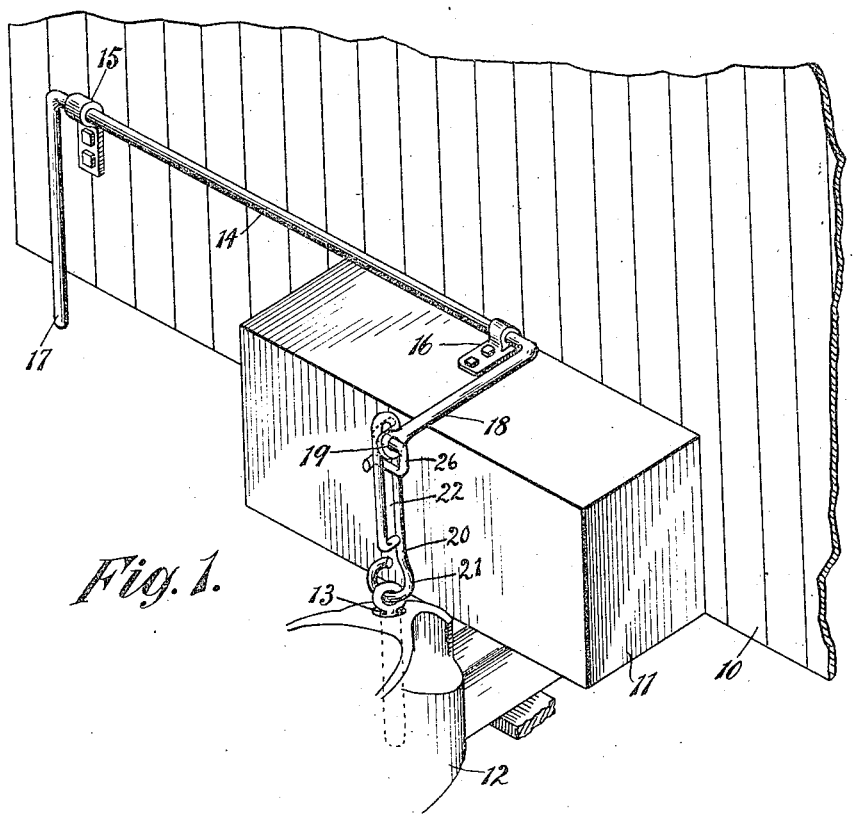
Figure 1 is a detail in perspective of the end of a car with the device applied thereto.
Figures 2, 3:
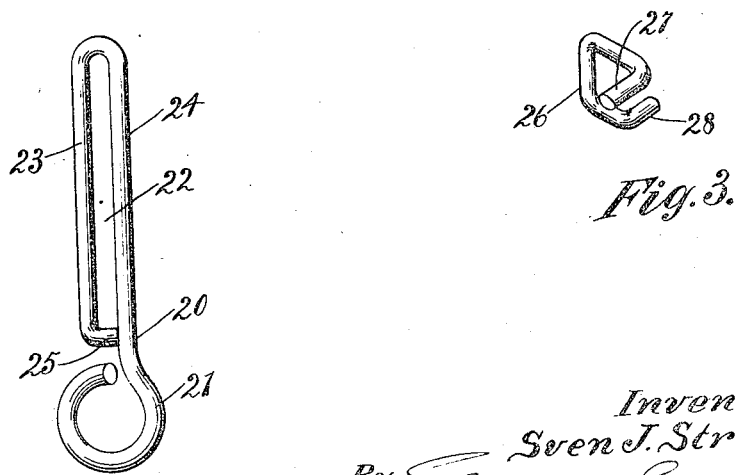
Fig. 2 is a view of the link adapted to be attached with the coupling pin.
Fig. 3 is a view of the clevis for connecting the link with the crank.

The end of an ordinary railway car is represented at 10, and the deadwood or buffer block at 11. A detail of the head of the coupler is shown at 12, and the coupling or locking pin at 13.

The usual crank shaft 14 is employed, and is shown as carried by brackets 15, 16, secured to the car. This crank is provided at its outer end with an operating handle 17, which normally hangs vertically, and at its inner end with a forwardly projecting crank arm 18. This crank shaft is of ordinary and usual construction, having at the outer end of its crank arm an eye 19 having a horizontal axis, and may be used with the improved connecting mechanism without change.

A single link 20 forms the means of connection between the crank arm 18 and the coupling pin 13. This link is provided at its lower end with a hook 21 for engaging the eye of the pin, and being substantially circular in form, its end being somewhat out of line with the body of the link in order that it may enter the pin eye. The body portion of the link is formed into an elongated loop 22, the rod being redoubled upon itself to form two parallel arms 23, 24, the extreme end of the rod being bent inwardly, as shown at 25, to bear against the main stem 24 and thus close the lower end of the loop.

A clevis 26 for connecting the link with the crank arm 18 is formed of a rod bent to U form, the ends 27, 28, of its side members being bent to project laterally and in opposite directions from the plane of the body portion.

In assembling one end of the clevis is inserted through the eye 19 of the crank arm and both of its ends are inserted through the loop 22, this loop being forced open by slightly bending the link member 23 outwardly, if necessary, to permit such entry.

In use the clevis is free to turn in the eye 19 to permit the longitudinal movements of the coupler 12, and the connection of the clevis with the eye of the crank and with the link is sufficiently free to permit the lateral swaying of the coupler. The raising of the handle 17 to turn the shaft 14 will lift the coupling pin out of its socket in the coupler for the purpose of uncoupling the cars. The pin may remain in its elevated or set position, as is usual after the uncoupling operation, the handle 17 being dropped and the clevis 20 sliding downwardly in the loop 22.

The improved link and connecting clevis may be applied to the ordinary crank without change of the latter, and the connection is made without the use of nuts or bolts. While the parts may be assembled and disconnected without difficulty, they are, nevertheless, so interlocked as to prevent their disengagement by meddlesome persons.

While there is shown a preferred form of construction, it is obvious that changes of detail may be made, as, for example, the particular manner of connecting the clevis with the crank arm, without departing from its scope.

I claim as my invention—

1. In an uncoupling device, in combination, a crank shaft having a horizontally disposed eye in its crank arm, a link adapted to engage a coupler locking pin and having an elongated loop, and a U-shaped clevis extending through the crank eye, both arms of the clevis projecting through the loop and having their ends bent laterally in opposite directions.

2. In an uncoupling device, in combination, a crank shaft, a pin engaging link having an elongated loop, and a one-piece clevis loosely interlocking with the crank arm of the shaft and with the loop of the link and slidingly engaging the loop.

3. In an uncoupling device, in combination, a crank shaft, a coupler pin engaging link having an elongated loop, and a U-shaped clevis having its ends projecting in opposite directions from the plane of its body, the body of the clevis extending loosely through the link loop and being loosely connected with the crank arm of the shaft.

4. In an uncoupling device, in combination, a crank shaft having a horizontal eye in its crank arm, a coupler pin engaging link having an elongated loop, a U-shaped clevis having its ends projecting in opposite directions from the plane of its body portion, the body of the clevis extending loosely through the link loop and one side member thereof extending through the crank eye.

5. In an uncoupling device, in combination, a crank shaft, a link having an open spiral hook for engaging the eye of a coupler pin and an elongated loop above the hook, and a one-piece clevis interlocking with the crank arm of the shaft and with the loop of the link and slidably engaging the loop.

SVEN J. STRID.